United States Patent
Eversole et al.

(10) Patent No.: US 10,292,372 B2
(45) Date of Patent: May 21, 2019

(54) HINGED WATER VALVE FOR POULTRY WATERING SYSTEM

(71) Applicant: The GSI Group LLC, Assumption, IL (US)

(72) Inventors: Nathan Robert Eversole, Assumption, IL (US); Bruce Slankard, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 0 days.

(21) Appl. No.: 16/071,664

(22) PCT Filed: Jan. 25, 2017

(86) PCT No.: PCT/US2017/014816
§ 371 (c)(1),
(2) Date: Jul. 20, 2018

(87) PCT Pub. No.: WO2017/132187
PCT Pub. Date: Aug. 3, 2017

(65) Prior Publication Data
US 2019/0029227 A1   Jan. 31, 2019

Related U.S. Application Data

(60) Provisional application No. 62/286,486, filed on Jan. 25, 2016.

(51) Int. Cl.
*A01K 39/02* (2006.01)
*F16K 21/00* (2006.01)
*A01K 39/024* (2006.01)

(52) U.S. Cl.
CPC ........ *A01K 39/0213* (2013.01); *A01K 39/024* (2013.01); *F16K 21/00* (2013.01)

(58) Field of Classification Search
CPC ................ A01K 39/0213; A01K 39/02; A01K 39/0206; A01K 39/022; A01K 39/024; A01K 39/026; A01K 39/04; F16K 21/00
See application file for complete search history.

(56) References Cited

U.S. PATENT DOCUMENTS 3,724,425 A    4/1973   Thompson
4,724,797 A *   2/1988   Steudler, Jr. ............. A01K 7/00
                                               119/72

(Continued)

FOREIGN PATENT DOCUMENTS

GB     2278532 A    12/1994
GB     2477279 A     8/2011

OTHER PUBLICATIONS

UK Intellectual Property Office, International Search Report for related UK Application No. GB1603210.4 dated Aug. 11, 2016.

(Continued)

*Primary Examiner* — Joshua D Huson

(57) ABSTRACT

A hinged water valve (26) for use in a watering (38, 46) system (50) of a poultry house includes rigid sight tubes (20) connected with hinged water valves (26). Each hinged valve (26) includes a valve body (28) with a valve cap (30) hinged to the valve body (28) with at least one hinge pin. The valve (26) permits flow of water into the sight tube (20) when the sight tube (10) is in its upright operational condition but prohibits flow of water toward the sight tube (20) when the sight tube (20) is pivoted to a substantially horizontal cleaning condition. An internal plunger (32) interacts with an internal seat (36) of the valve body (28) in a sealing manner. A biasing spring (40) urges the plunger (32) into contact with the internal seat (36) of the valve body (28) but with the valve cap (30) in the upright condition, the stem (50) forces the plunger (32) away from the internal seat (36) opening a flow passage (41).

8 Claims, 7 Drawing Sheets

(56) References Cited

U.S. PATENT DOCUMENTS

| | | | | |
|---|---|---|---|---|
| 4,884,528 | A | 12/1989 | Steudler, Jr. | |
| 4,991,621 | A * | 2/1991 | Steudler, Jr. | G05D 16/0683 137/505.46 |
| 5,025,754 | A * | 6/1991 | Plyler | A01K 7/02 119/73 |
| 5,070,903 | A * | 12/1991 | Steudler, Jr. | G05D 16/0683 137/505.46 |
| 5,136,983 | A * | 8/1992 | Hostetler | A01K 7/02 119/72 |
| 5,174,331 | A * | 12/1992 | Steudler, Jr. | G05D 16/0683 137/505.46 |
| 5,178,079 | A * | 1/1993 | Hostetler | A01K 39/0213 119/72 |
| 5,184,570 | A | 2/1993 | Ziggity | |
| 5,184,571 | A | 2/1993 | Avtron | |
| 5,239,944 | A * | 8/1993 | Hostetler | F16L 47/10 119/72 |
| 5,245,950 | A | 9/1993 | Johnson | |
| 5,247,963 | A * | 9/1993 | Hostetler | A01K 7/02 119/72 |
| 5,282,440 | A * | 2/1994 | Hostetler | A01K 39/0213 119/72 |
| 5,284,110 | A * | 2/1994 | Hostetler | A01K 39/0213 119/72 |
| 5,293,836 | A * | 3/1994 | Hostetler | A01K 39/0213 119/72 |
| 5,327,853 | A * | 7/1994 | Hostetler | A01K 39/0213 119/72.5 |
| 5,339,768 | A * | 8/1994 | Schumacher | A01K 39/02 119/72 |
| 5,660,139 | A | 8/1997 | Hostetler | |
| 5,794,849 | A * | 8/1998 | Elder | A01G 25/023 239/99 |
| 5,870,970 | A | 2/1999 | Plasson | |
| 6,712,021 | B2 | 3/2004 | Pollock | |
| 6,854,420 | B2 * | 2/2005 | Crocker | A01K 39/0213 119/72 |
| 7,219,689 | B2 * | 5/2007 | Pollock | G05D 16/0655 137/495 |
| 8,056,509 | B1 * | 11/2011 | Hostetler | A01K 39/0213 119/72 |
| 8,875,659 | B2 * | 11/2014 | Schumacher | A01K 39/02 119/72 |
| 9,004,098 | B2 * | 4/2015 | Roes | A01K 39/0213 137/505.14 |
| 9,133,945 | B2 * | 9/2015 | Roes | A01K 39/0213 |
| 9,603,343 | B2 * | 3/2017 | Willis | A01K 39/02 |
| 2003/0111019 | A1 * | 6/2003 | Pollock | A01K 39/0213 119/72 |
| 2007/0215056 | A1 * | 9/2007 | Kreger | A01K 39/0213 119/72.5 |
| 2010/0116214 | A1 * | 5/2010 | Schumacher | A01K 7/06 119/73 |
| 2010/0252126 | A1 * | 10/2010 | Roes | A01K 39/0213 137/505 |
| 2012/0318202 | A1 * | 12/2012 | Schumacher | A01K 39/02 119/74 |
| 2014/0000524 | A1 | 1/2014 | Orgill | |
| 2014/0190580 | A1 * | 7/2014 | Roes | A01K 39/0213 137/505 |
| 2015/0047569 | A1 * | 2/2015 | Orgill | F16K 24/046 119/72 |
| 2015/0136262 | A1 * | 5/2015 | Willis | A01K 39/02 137/870 |
| 2017/0196204 | A1 * | 7/2017 | Willis | A01K 39/02 |

OTHER PUBLICATIONS

European Patent Office, International Search Report for related International Application No. PCT/US2017/0014816, dated Apr. 3, 2017.

* cited by examiner

HINGED WATER VALVE FOR POULTRY WATERING SYSTEM

CROSS REFERENCE TO RELATED APPLICATION

This application claims the benefit of U.S. Provisional Application No. 62/286,486, filed Jan. 25, 2016, which is hereby incorporated by reference in its entirety.

BACKGROUND OF THE INVENTION

Field of Invention

This disclosure relates to poultry watering systems, and more particularly to a hinged water valve connecting a rigid sight tube to the watering system.

Description of Related Art

Drinking or watering systems for poultry houses are supplied with water at relatively high line pressure (e.g., 30-60 psi). The water is delivered at lower pressure to a watering line extending the length of a poultry house or the like. The watering line has a series of spaced apart watering stations or drinkers therealong at which birds can get water by pecking at a movable pin or lever.

For the drinkers to operate properly, the water pressure in the watering line must be reduced to only a few inches of water. Typically, in order to reduce the water pressure, the water passes through a regulator before entering the water line which leads to the drinking stations. One such regulator is shown for example in U.S. Pat. No. 6,712,021 to Pollock. Water is desirably supplied to the poultry at different rates according to their stage of growth; i.e., at a lower rate while they are young chicks, and at an increasing rate as they grow towards maturity. Downstream from the regulators, the watering system contains sight tubes that serve as visual indicators for indicating the pressure in the system.

Currently, flexible sight tubes surrounded by external coil springs are used to check the water pressure. The sight tubes are flexible in order to allow for the water lines to be hoisted up between flocks so that the poultry house may be cleaned and bedding changed without having to remove the sight tubes. However, a down side to the flexible sight tubes is that by using the external spring, the sight tubes are difficult to clean, and it is more difficult to see the water level.

BRIEF SUMMARY OF THE INVENTION

Briefly stated, the invention is directed to a hinged water valve for use in a watering system of a poultry house. The watering system is configured to be raised from an operational position near a floor of the poultry house to a raised position near a ceiling of the poultry house so the poultry may be cleaned. The watering system includes at least one rigid sight tube that serves as a visual indicator for the pressure in the watering system, wherein the at least one sight tube connects to a connector fitting of the watering system with the hinged water valve.

The hinged water valve includes a valve body that mates with the connector fitting of the watering system, the valve body having an upper portion comprising a top seating protrusion surrounding a flow passage, the valve body further comprising an internal seat. The hinged water valve includes a valve cap receiving the rigid sight tube and positioned on the valve body. The valve cap and valve body form a hinged connection coupling the valve cap to the valve body with at least one hinge pin. The valve permits flow of water into the sight tube when the sight tube is in its upright operational condition but prohibits flow of water toward the sight tube when the sight tube is pivoted to a substantially horizontal cleaning condition. The valve cap has an underside that forms a flared inlet, the flared inlet providing a sealing surface configured to mate with the top seating protrusion of the valve body when the valve cap is positioned such that the rigid sight tube is in the operational upright condition. The valve cap has a stem protruding from the flared inlet.

The hinged water valve has an internal plunger shaped to slide inside the valve body. The internal plunger is configured to interact with the internal seat of the valve body in a sealing manner. A biasing spring urges the plunger into contact with the internal seat of the valve body thereby plugging a flow passage through an upper portion of the valve seat such that when the plunger is pressed against the internal seat of the valve body, water is prevented from flowing through the flow passage. With the valve cap in the upright condition, the stem contacts the plunger and forces the plunger away from the internal seat against the biasing force of the spring so that water flows around the plunger past the internal seat and through the flow passage and into the sight tube.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Corresponding reference characters indicate corresponding parts throughout the several views of the drawings.

DESCRIPTION OF PREFERRED EMBODIMENTS

Figure 1:
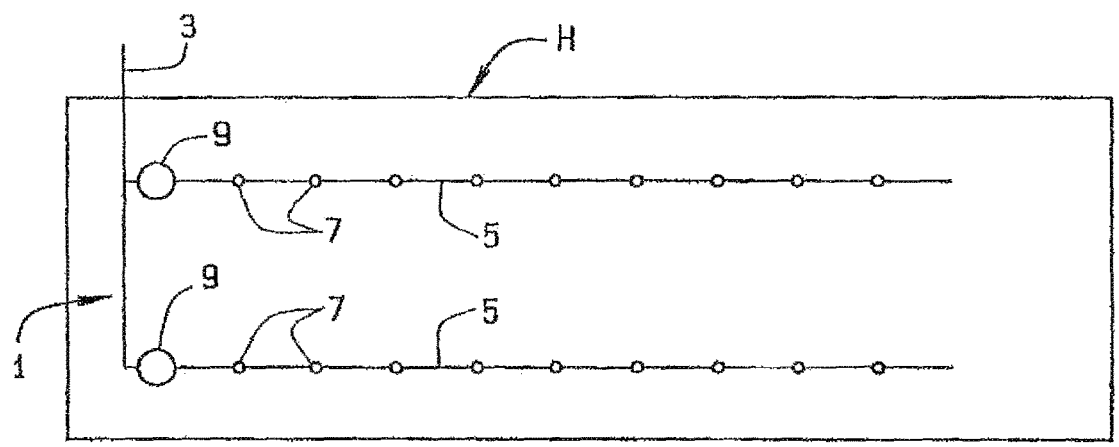
FIG. 1 is a schematic of a poultry watering system.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

The following detailed description illustrates the invention by way of example and not by way of limitation. This description will clearly enable one skilled in the art to make and use the invention, and describes several embodiments, adaptations, variations, alternatives and uses of the invention, including what is presently believed to be the best mode of carrying out the invention.

A portion of a watering system 1 for use in a poultry house H is shown in FIG. 1. The watering system 1 includes a water supply pipe 3 which is connected to watering pipes 5, two of which are shown. A plurality of watering stations or drinkers 7 is spaced along each watering pipe 5. As is known, watering stations 7 in poultry houses include valves, which are activated by birds pecking against a pin. Hence, the pressure within the water pipes 5 is critical, and must be maintained at a low pressure (i.e., less than 6"-12" of water) which is substantially less than the line pressure (e.g., 30-60 psi). Thus, water regulators 9 are positioned in the water pipes 5 before the watering stations 7. The regulators 9 are desirably placed at the beginning of the water pipes 5, as schematically shown in FIG. 1.

Figure 2A:
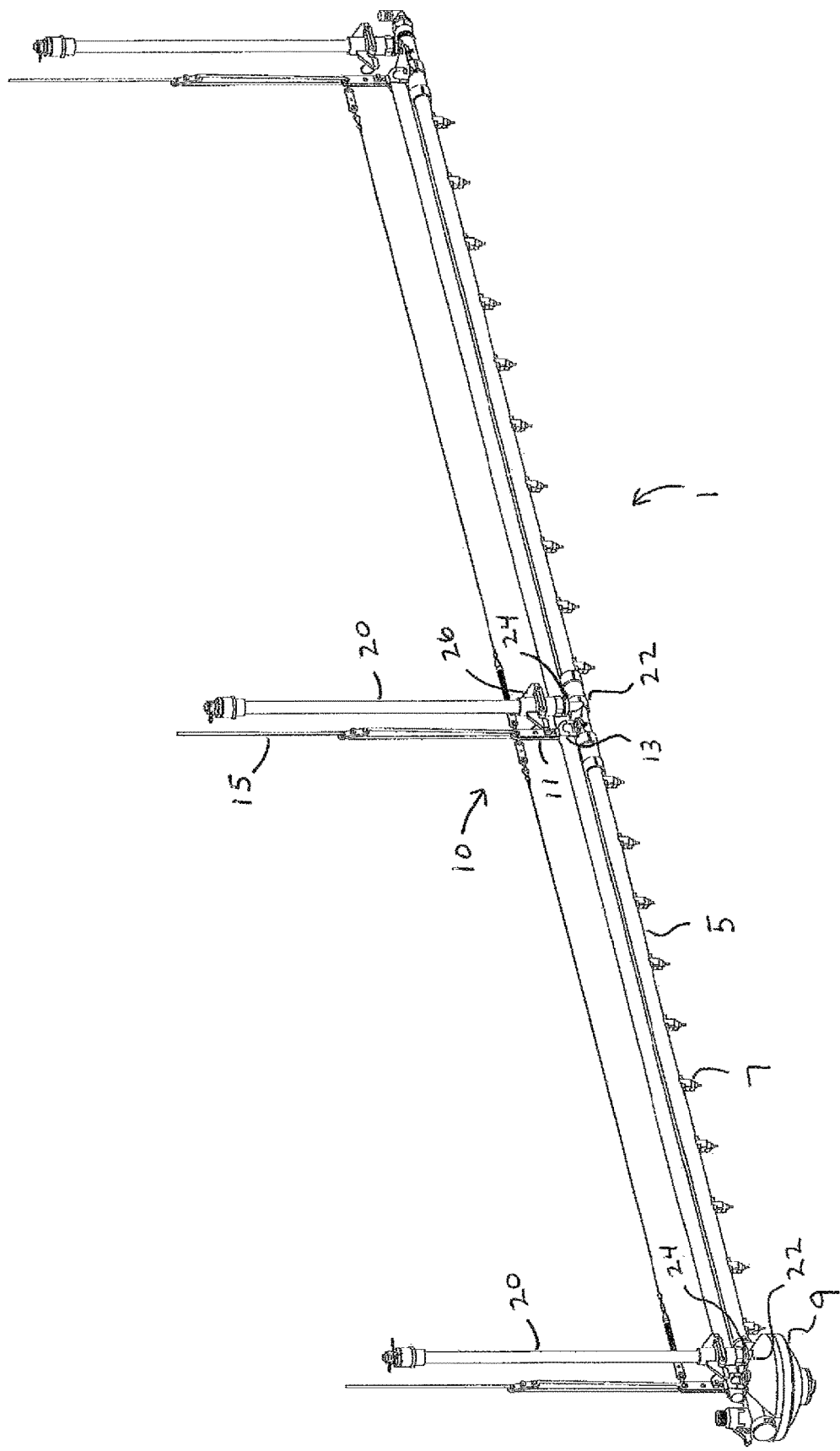
FIG. 2A is a perspective view of a portion of the poultry watering system of FIG. 1 with sight tubes in an upright operational condition.

Turning also now to FIG. 2A, as is known, the watering system 1 is suspended from the roof rafters of the poultry house H by a suspension system 10. The regulators 9 and water pipes 5 are carried by the suspension system 10, which includes hangers 11 and brackets 13 that support the watering pipe 5 at spaced locations therealong. Cables 15 attached to the hangers 11 suspend the watering pipes 5 from the roof trusses or the like of the poultry house H. Typically, cables 15 are part of a motorized winch and cable assembly (not shown) that when selectively operated allows the watering system 1 to be raised and lowered. The cables 15 are spaced at desired intervals (e.g., 5-15 feet) so as to suspend the watering pipes 5 and regulators 9 in the poultry house H without undue deflection. It will be understood that the term cable refers generically to any member that may be used to suspend the watering system 1 from the roof structure of a poultry house H. Such tension suspension members could include wire cables, chains, ropes, wires, rods, links or the like. Periodically, it is desirable to raise the watering system 1 so that the poultry house H may be cleaned and new bedding put down between poultry batches.

The watering system 1 contains a plurality of rigid sight tubes 20 that serve as visual indicators for visually indicating the pressure in the watering pipe 5 at select locations. For this purpose, the sight tubes 20 are either transparent, or at least include a transparent section, to enable the level of the water within the respective sight tube 20 to be seen by an observer. In the illustrated embodiment, each sight tube 20 is provided at a connector 22 adapted to receive the sight tubes 20 via a threaded fitting 24 at the outlet end of the pressure regulator 9 to indicate the inlet pressure. Additional sight tubes 20 are provided in the watering pipe 5, which also includes connectors 22 adapted to receive the sight tubes 20 via threaded fittings 24.

Figure 2B:
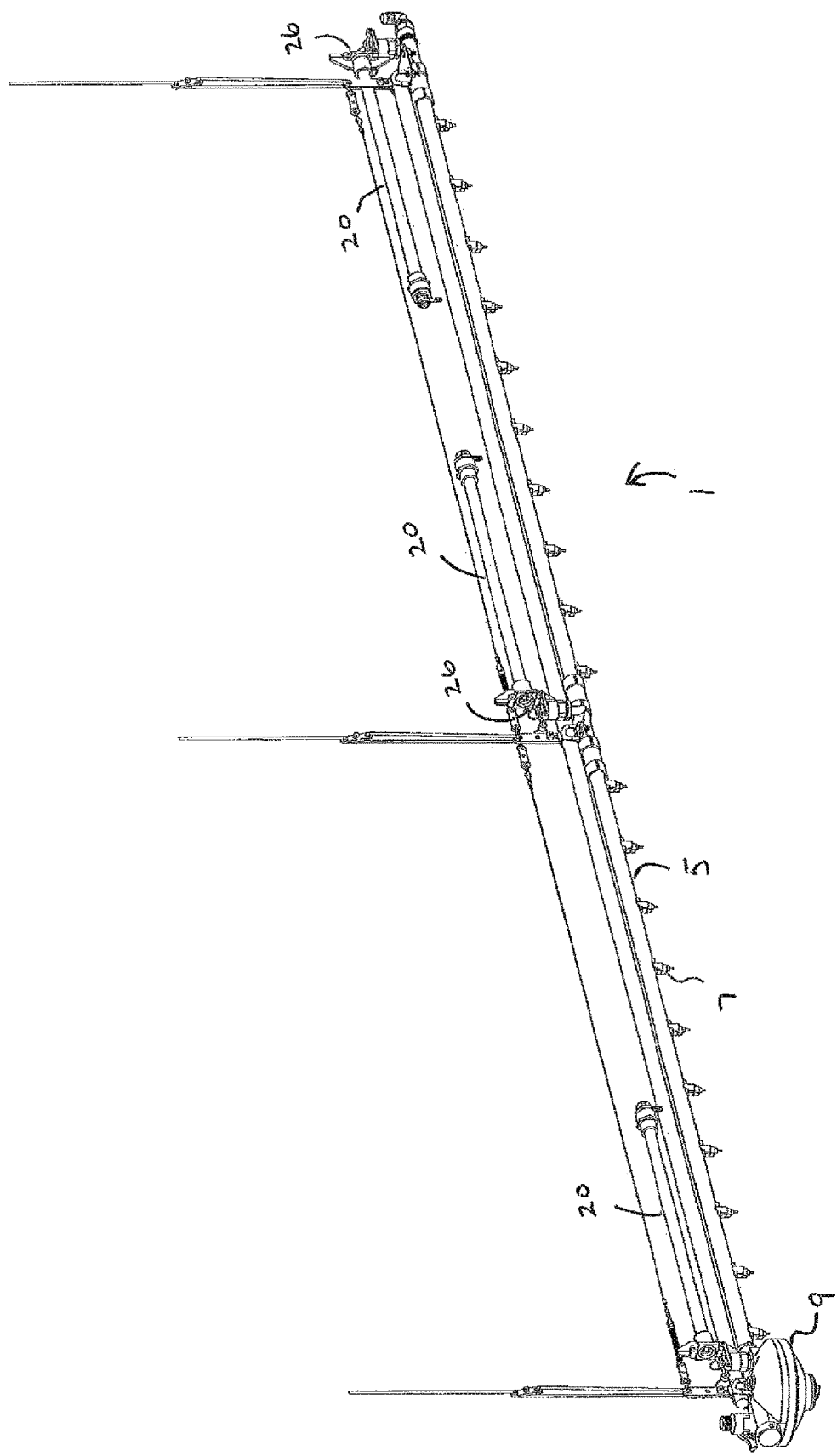
FIG. 2B is a perspective view of the portion of the poultry watering system of FIG. 2A with sight tubes in a substantially horizontal cleaning condition.
Figure 3:
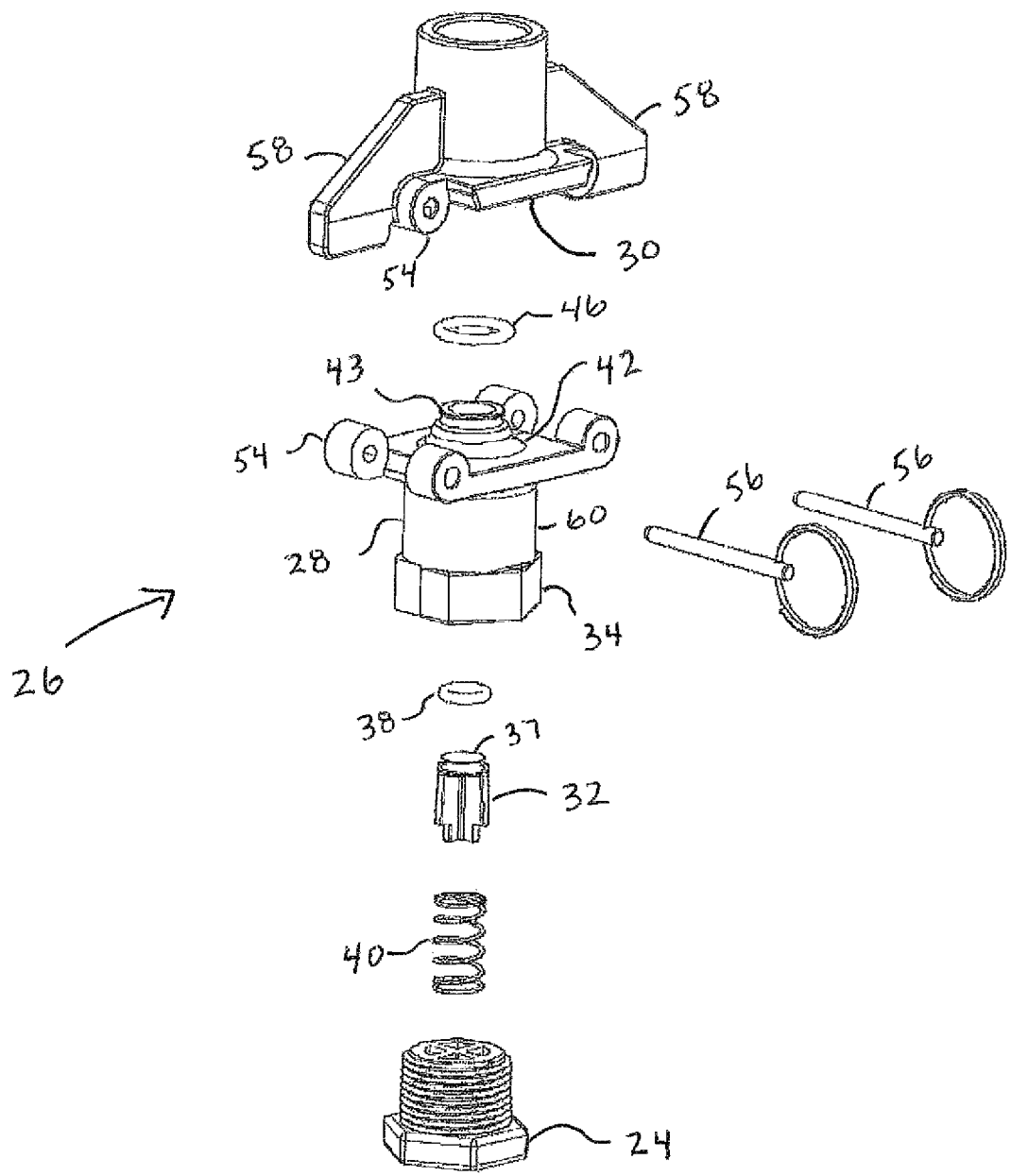
FIG. 3 is an exploded perspective view of hinged water valve of the watering system of FIG. 1.
Figure 4:
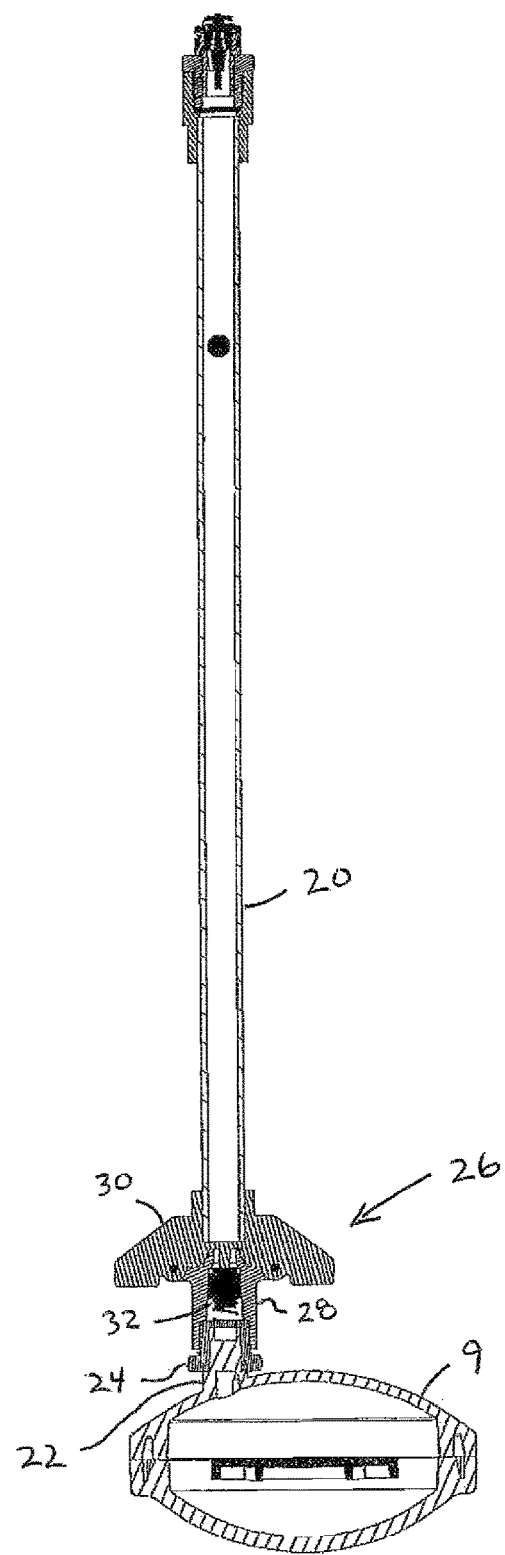
FIG. 4 is a sectional view of the hinged water valve with the sight tube in its upright operational condition.
Figure 5:
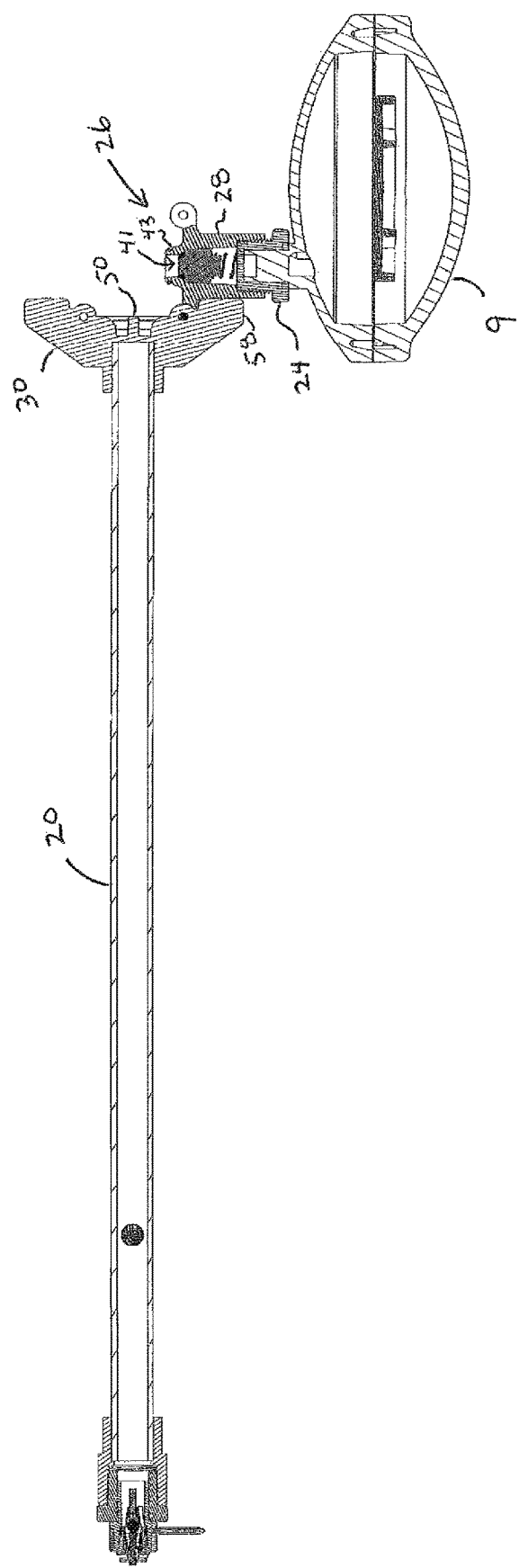
FIG. 5 is a sectional view of the hinged water valve with the sight tube in its.
Figure 6:
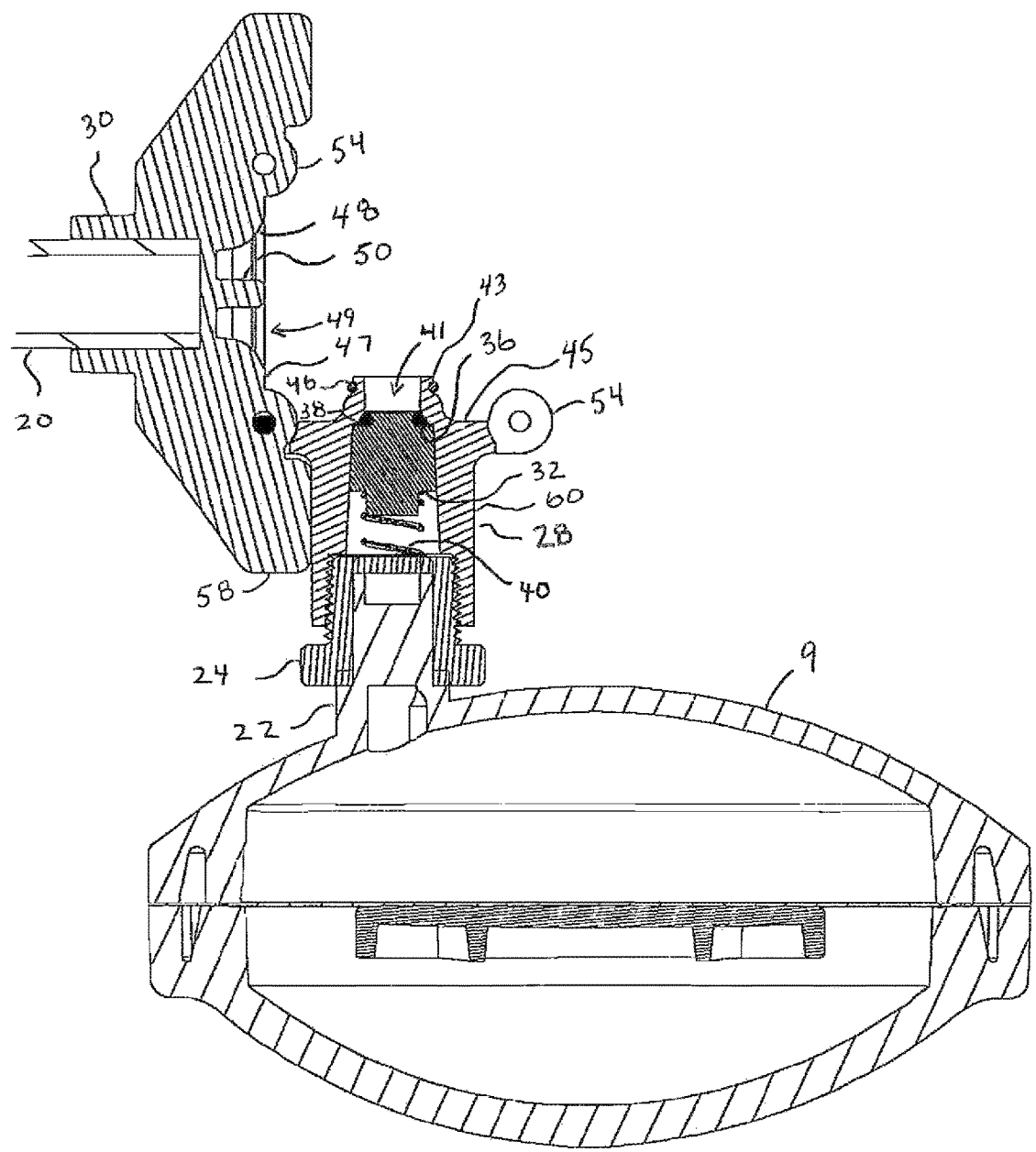
FIG. 6 is an enlarged sectional view of the hinged water valve of FIG. 5.

According to the invention, the rigid sight tubes 20 are connected to the fittings 24 with a hinged water valve 26 so that the sight tubes 20 can be pivoted sideways as shown in FIG. 2B so the sight tubes 20 do not contact the ceiling and break when the watering system 1 is raised toward the ceiling of the poultry house H by the suspension system 10. Turning now to FIGS. 3-6, the hinged water valve 26 has a valve body 28 that mates with the connector fitting 24, a valve cap 30 connected to the valve body 28 in a hinged configuration as will be described below, and an internal plunger 32. The valve 26 is configured such that the valve permits flow of water into the sight tube 20 when the sight tube is in its vertical operational condition, but prohibits flow of water toward the sight tube when the sight tube is either pivoted sideways as shown in FIGS. 5 and 6 or separated from the valve body 28.

In the illustrated embodiment, a bottom portion 34 of the valve body 28 is threaded to allow for connection to the threaded connector fitting 24. This desirably allows the valve 26 to be connected to various water line components in the watering system 1 wherever a sight tube 20 is desired.

The plunger 32 is shaped to slide inside the valve body 28 where it interacts with an internal seat 36 of the valve body 28 in a sealing manner. Desirably, a top circumferential lip 37 of the plunger 32 is fitted with a plunger O-ring 38 such that the plunger O-ring 38 makes contact with the internal seat 36 of the valve body 28. A spring 40 provides a biasing force, which keeps the plunger 32 in contact with the internal seat 36 of the valve body 28 thereby plugging a flow passage 41 through an upper portion 42 of the valve body 28. With the plunger 32 pressed against the internal seat 36 of the valve body 28, water is prevented from flowing out of the valve body 28.

The upper portion 42 of the valve body 28 has a top seating protrusion 43 surrounding the flow passage 41 and desirably fitted with a protrusion O-ring 46. An underside 47 of the valve cap 30 has a flared inlet 48 that provides a sealing surface configured to mate with the top seating protrusion 43 of the valve body 28 when the valve cap 30 is in the upright condition as shown in FIG. 4. This allows for the valve 26 to seal before flow is actually opened up into the sight tube 20. The flared inlet 48 forms a donut-shaped annular opening 49 surrounding a stem 50 protruding from the middle thereof. With the valve cap 30 in the upright condition, the stem 50 makes contact with the plunger 32, forcing the plunger 32 downward against the biasing force of the spring 40 so that water can flow around the plunger 32 past the internal seat 36 and through the flow passage 41 and into the sight tube 20. Thus, when the sight tube 20 is in its vertical operational condition, the flow passage 41 is open permitting water to flow into the sight tube 20 permitting the sight tube to indicate the actual water pressure in the watering pipe 5. But when the valve cap 30 is pivoted to the sideways condition or removed, the stem 50 pulls away from the plunger 32 allowing the biasing spring 40 to force the plunger 32 back into its sealing position against the internal seat 36.

In the illustrated embodiment, the top cap 30 and valve body 28 of the valve 26 have hinge connections 54 on either side of the valve 26 coupled with a pair of hinge pins 56. Having hinge connections 54 on either side of the valve 26 allows the sight tube 20 to hinge in two directions by removing either one of the hinge pins 56 and pivoting the sight tube 20 about the other one of the hinge pins 56. The sight tube 20 can also be removed by removing both pins 56. Desirably, the top cap 30 of the valve 26 has gusseted supports 58 on both sides of the top cap 30 such that one of the gusseted supports makes contact and rests on a side portion 60 of the valve body 28 when the sight tube 20 is hinged over, thereby supporting the sight tube.

Accordingly, the rigid sight tubes 20 have the ability to fold over so that the watering system 1 can be raised toward the ceiling of the poultry house H so that the bedding can be changed. This is executed by pulling one of the pins 56 out of each of the valves 26 and pivoting the sight tubes 20 so that they are in a folded condition generally parallel with the floor of the poultry house H. Pulling both pins 56 out of the valve 26 will allow the sight tube 20 to be removed so that the sight tube and valve may be cleaned. The hinged water valve 26 allows for the rigid sight tube 20 to be used while also allowing it to fold down out of the way when the water lines 5 are hoisted toward the ceiling.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A watering system of a poultry house configured to be raised from an operational position near a floor of the poultry house to a raised position near a ceiling of the poultry house, the watering system comprising:
   at least one rigid sight tube that serves as a visual indicator for the pressure in the watering system, wherein the at least one rigid sight tube connects to a connector fitting of the watering system with a hinged water valve, the hinged water valve comprising:
      a valve body that mates with the connector fitting of the watering system, the valve body having an upper portion comprising a top seating protrusion surrounding a flow passage, the valve body further comprising an internal seat;
      at least one hinge pin;
      a valve cap receiving the at least one rigid sight tube and positioned on the valve body, the valve cap and valve body comprising a hinged connection coupling the valve cap to the valve body with the at least one hinge pin, wherein the valve permits flow of water into the at least one rigid sight tube when the at least one rigid sight tube is in its upright operational condition but prohibits flow of water toward the at least one rigid sight tube when the at least one rigid sight tube is pivoted to a substantially horizontal cleaning condition, wherein an underside of the valve cap forms a flared inlet, the flared inlet providing a sealing surface configured to mate with the top seating protrusion of the valve body when the valve cap is positioned such that the rigid sight tube is in an operational upright condition, wherein the valve cap has a stem protruding from the flared inlet;
      an internal plunger shaped to slide inside the valve body, the internal plunger configured to interact with the internal seat of the valve body in a sealing manner; and
      a biasing spring configured to urge the plunger into contact with the internal seat of the valve body thereby plugging a flow passage through an upper portion of the valve seat such that when the plunger is pressed against the internal seat of the valve body, water is prevented from flowing through the flow passage, wherein with the valve cap in the upright condition, the stem contacts the plunger and forces the plunger away from the internal seat against the biasing force of the spring so that water flows around the plunger past the internal seat and through the flow passage and into the at least one rigid sight tube.

2. The watering system of claim 1 wherein a bottom portion of the valve body is threaded to allow for connection to the threaded connector fitting.

3. The watering system of claim 1 wherein a top circumferential lip of the plunger is fitted with a plunger O-ring such that the plunger O-ring makes contact with the internal seat of the valve body.

4. The watering system of claim 1 wherein the flared inlet allows for the hinged water valve to seal before flow is actually opened up into the sight tube.

5. The watering system of claim 1 wherein the hinged water valve has a pair of hinge connections on either side thereof, each hinge connections couple with a hinge pin, wherein the pair of hinge connections allow the sight tube to hinge in two directions by removing either one of the hinge pins and pivoting the sight tube about the other one of the hinge pins.

6. The watering system of claim 5 wherein the valve cap and sight tube is removable by removing both pins.

7. The watering system of claim 5 wherein the valve cap has gusseted supports on opposite sides of the valve cap such that one of the gusseted supports makes contact and rests on a side portion of the valve body when the sight tube is hinged over.

8. The watering system of claim 5 wherein the top seating protrusion comprises a protrusion O-ring.

* * * * *